United States Patent Office 3,579,385
Patented May 18, 1971

3,579,385
METHOD OF IMPREGNATING METALLIC FIBER BATTERY ELECTRODES
William Feduska, Edgeworth, and Jack T. Brown, Pittsburgh, Pa., assignors to Westinghouse Electric Corporation, Pittsburgh, Pa.
Continuation of application Ser. No. 764,461, Oct. 2, 1968. This application Apr. 13, 1970, Ser. No. 28,179
Int. Cl. H01m 35/30, 43/04
U.S. Cl. 136—75                                   6 Claims

ABSTRACT OF THE DISCLOSURE

A method of loading active material into flexible, bonded, metallic fiber, porous battery plaques, by a plurality of molten salt impregnation and electrolysis steps, for use as positive and negative electrodes in cells and batteries, wherein the active material is conditioned by an intermediate charging and/or intermediate charging and discharging formation step. The conditioning step is between the loading steps and causes the active material, precipitated during electrolysis, to compact against and between the flexible metal fibers, opening the pores of the plaque and allowing additional loading at a high rate in subsequent impregnation-electrolysis steps.

This application is a continuation of our copending application Ser. No. 764,461, filed Oct. 2, 1968, now abandoned.

BACKGROUND OF THE INVENTION

The invention relates to a new and improved technique for loading active materials into bonded, flexible, metallic fiber plaques utilizing intermediate charging and discharging steps which are followed by further impregnating-electrolyzing steps.

The efficiency of any electrode will depend primarily upon the surface area of the active material exposed to electrolyte at any given time. One of the most effective electrode plaques, insofar as loading active materials is concerned, is one having a sintered or diffusion bonded metallic fiber structure. The sintered, metallic fiber structure, for example, can contain more active chemicals in a given volume than the standard, sintered, metal powder plate structures. There is a need however for new, improved and simplified methods of loading the bonded, metallic fiber plaque in order to get maximum cell and battery performance and output at the lowest possible cost. Prior art methods involved a plurality of impregnation-electrolysis steps, followed by a final charge and discharge formation step, after a predetermined loading was applied to the electrode plaque. Such methods did not take advantage of the flexibility of the plaque to increase loading of active materials by continuing the impregnation-electrolysis steps after the charging and discharging steps.

SUMMARY OF THE INVENTION

Accordingly, it is an object of this invention to provide a new and improved method for loading active material into bonded, flexible, metallic fiber plaques.

Another object is to provide new and improved electrode plates made by utilizing intermediate conditioning steps in the loading process.

Our invention accomplishes the foregoing objects by following carefully controlled processing steps which insure maximum loading and retention of the active material in the metallic fiber plaque. The process consists most simply of the following steps: (1) Bonded, flexible, nickel fiber plaques are immersed in either molten hydrated nickel-cobalt nitrate or molten hydrated cadmium nitrate salt solutions. (2) These plaques are then immersed in hot potassium hydroxide solution and electrolyzed to produce a precipitate build of the active material. (3) Intermediate electrical charging, discharging and/or charging of the precipitate (conditioning) is accomplished in potassium hydroxide solution. This causes the precpitated active material to be converted to its charged state, change in volume, and open up unfilled pores in the plaque by compacting against and between the flexible nickel fibers of the plaque. This step is critical in order to insure conditioning to enable the high loading of the plaques. (4) The electrodes are then washed and dried. (5) The loading step is repeated. (6) The plaques may then undergo a final charging and discharging formation.

The intermediate conditioning causes tremendous increases in active material loading and can be used as outlined above, or in any other process variation such as, for example: impregnation, electrolysis, charging, repeating that cycle a plurality of times, intermediate charging and discharging formation, and repeating the impregnation and electrolysis steps at least once. This latter variation might have, for example, four repeated impregnation, electrolysis, charging steps, then an intermediate charging and discharging formation followed by another four repeated impregnation, electrolysis, charging steps and ending with a final formation step. It is to be understood however, that this invention is not to be limited to any particular series of steps, but encompasses any method of loading a bonded, flexible, metallic fiber porous battery plaque which employs an intermediate conditioning step comprising: at least one charging formation step intermediate in the process or at least one intermediate charging and discharging formation step or at least one combination of intermediate charge formation with intermediate charging and discharging formation. The last series of steps is preferred for optimized loading of the plaques. This conditioning is used to increase subsequent loading of the flexible, bonded, metallic fiber plaques.

BRIEF DESCRIPTION OF THE DRAWING

For a better understanding of the nature and objects of the invention reference may be made to the drawing, in which.

PREFERRED EMBODIMENTS OF THE INVENTION

Figure 1:
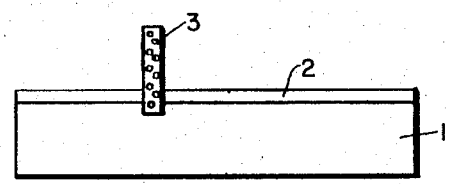
FIG. 1 shows a view of a loaded, bonded, metallic fiber plate.

The nickel-cadium cell has been known since about 1900. The present day commercial sealed cell, basically, consists of an inert electrode material (usually low-density nickel powder, sintered either to nickel wire or punched, nickel-plated steel strip) which supports in the discharged state, the active materials—generally $Cd(OH)_2$ on the negative electrode and $Ni(OH)_2$ on the positive electrode.

During charging, in the presence of potassium hydroxide solution, the following reactions occur:

$$Cd(OH)_2 + 2e^- \rightarrow Cd + 2OH^- \quad (+.815 \text{ v.})$$

and, $$2Ni(OH)_2 + 2OH^- \rightarrow 2NiOOH + 2H_2O + 2e^- \quad (-.490 \text{ v.})$$

When these reactions are combined, the charging reaction becomes:

$$2Ni(OH)_2 + Cd(OH)_2 \rightarrow Cd + 2NiOOH + 2H_2O$$

An overall voltage of 1.305 v. is theoretically obtained. Of course, during discharge, the reverse reaction occurs.

The structural nature of the plaque directly determines the amount per unit volume of $Cd(OH)_2$, $Ni(OH)_2$ or other active material that can be loaded and utilized at various drain rates. In turn, the amounts of these loaded utilized active materials determine the overall capacity of the cell in ampere hours. Each gram of $Ni(OH)_2$ formed can theoretically provide a capacity of 0.289 ampere hour and each gram of $Cd(OH)_2$ can theoretically provide a capacity of 0.366 ampere hour. The determination of a suitable electrode plaque structure, which can be easily and heavily loaded with active material and which allows utilization of a high percentage of active material, is paramount in the construction of an optimized nickel-cadmium cell.

At present the sintered, powder plate electrode plaque is standard in the industry. This structure is prepared by sintering, to a controlled thickness and porosity, layers of fine carbonyl nickel powder which has been spread over an embedded grid of either nickel screen wire or nickel-plated steel strip which has been perforated with numerous holes. While both of these plaques can provide an electrode of high surface area, they have distinct disadvantages. For example, the sintered, powder plate structure does not have sufficient flexibility to permit a wound section of a diameter smaller than ¼ inch and most importantly, it is not flexible enough to allow utilization of intermediate formation in the loading process.

It was found that optimized nickel-cadmium cells are possible through careful processing of a flexible bonded metallic fiber skeleton, such as that disclosed by Troy, U.S. Pat. 3,127,668, or made by other means such as that disclosed in U.S. Ser. No. 764,527, assigned to the assignee of this invention. Not all the parameters disclosed in Troy produce skeletons suitable as the starting point in making electrode plaques. However, the sintered Troy skeleton when modified for our purposes, can be made into metal fiber plaques of considerable strength and yet adequate flexibility for the intermediate formation step heretofore described. For maximum loading the fiber diameter of the plaques must be between .0002 to .003 inch and plaque porosity must be between 75 and 90 percent, i.e., plaque densities falling between 10 to 25 percent of theoretical.

Figure 2:
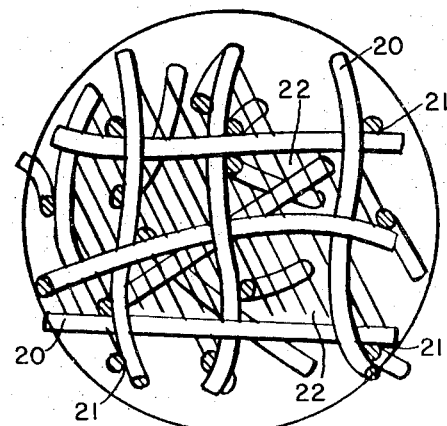
FIG. 2 shows a magnified view of the fibers of the bonded plate filled with impregnated solution.

FIG. 1 shows one type of plate structure. The electrode plate 1 is a plaque loaded with active material. The structure has one edge 2 coined to a high density. This coined area provides a base to which two strips 3 of metal for example, pure nickel are spot welded. These welded strips become electrical lead tabs for positive or negative plates. The bonded, fiber plaque structure is shown magnified in FIG. 2 after the impregnation step. It contains metal fibers 20 such as nickel fibers which are bonded together at points 21 along their length. The hydrated metallic nitrate impregnant 22 is shown held in the pore area between the fibers of the structure.

Conventional vacuum impregnation or other techniques can be used to impregnate the plaque but the simplified technique of immersion in molten nitrate salts is preferred. This preferred method encompasses successive immersions of the plaque into either a positive molten hydrated nitrate salt mixture, such as, for example, $Ni(NO_3)_2.6H_2O:Co(NO_3)_2.6H_2O$, or negative molten hydrated nitrate salt, such as, for example, $Cd(NO_3)_2.4H_2O$. The temperature of the molten salt baths should be maintained between the melting point of the salt and 100° C. The preferred temperature is at 85° C. which is about 25° C. above the melting points of the salts. Each bath should be covered except during immersion, to minimize vaporization of the water of crystallization. The change in specific gravity of the baths must be checked to determine the amount of vaporization. We found maximized loading was obtained when the molten salt was within a specific gravity range of 1.80±.20.

The cold metal fiber plaques can be preetched in $HNO_3$ at room temperature prior to the first dip. This cleans the nickel fibers and increases wettability of the fibers by the nitrate solution. The plaques should be lowered very slowly into the baths, so as to minimize the amount of air trapped in the pore area of the structure. They should be left immersed for 5 to 10 minutes. After this step the entrapped liquid nitrate is held in the plaque pores by capillary attraction and fills almost 100 percent of the electrode pore area.

The positive salt mixture contains about a 20:1 weight ratio of nickel to cobalt. The cobalt greatly improves utilization of the active material by increasing electrical conductivity and improving cycle life of the electrode.

After allowing excess salt to drip off, the plaques are placed in their separate electrolysis tanks. Here the nitrate solutions impregnated into the pores of the plaques are reacted with a potassium or sodium hydroxide solution preheated to 90°–110° C. Potassium hydroxide is preferred since its use does not necessitate a washing step between electrolysis and intermediate formation. During electrolysis, the plaques or electrodes are maintained negative and nickel electrolysis containers are maintained positive. During electrolysis the following unbalanced reaction substantially occurs on the plaques for positive electrodes:

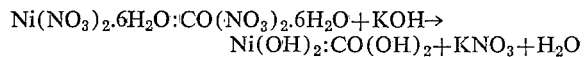

$$Ni(NO_3)_2.6H_2O:Co(NO_3)_2.6H_2O+KOH \rightarrow$$
$$Ni(OH)_2:Co(OH)_2+KNO_3+H_2O$$

On the plaques for the negative electrodes, this reaction occurs:

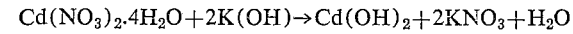

$$Cd(NO_3)_2.4H_2O+2K(OH) \rightarrow Cd(OH)_2+2KNO_3+H_2O$$

Figure 3:
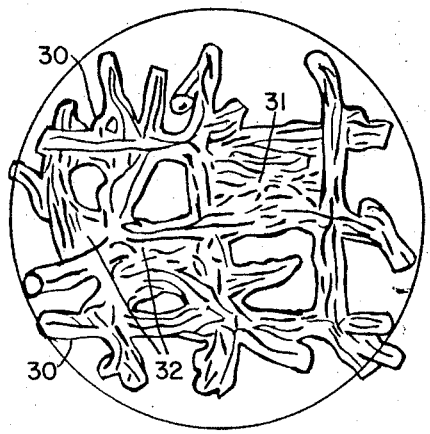
FIG. 3 shows a magnified view of the fibers of the plate filled with active material prior to the conditioning steps.

As shown in FIG. 3, during electrolysis, a solid metallic hydroxide active material precipitate build 30 is produced in the pores of the plaque. This precipitate is $Ni(OH)_2$ in the positive plaque and $Cd(OH)_2$ in the negative plaque. Both of these solid active materials are in spongy low density form. Regardless of the number of cycles they will only fill about 40 percent of the available pore volume within the plaque structure because they block further impregnation to the innermost portions of the plaque. Such a hinderance is shown at points 31 and 32. Optimum loading is about 60 percent of the available pore volume within the plaque. Such a loading would give maximum surface area of active material while still allowing sufficient electrolyte exposure when used in a cell or battery. Such loading is made possible easily and cheaply by the conditioning steps of this invention.

Figure 5:
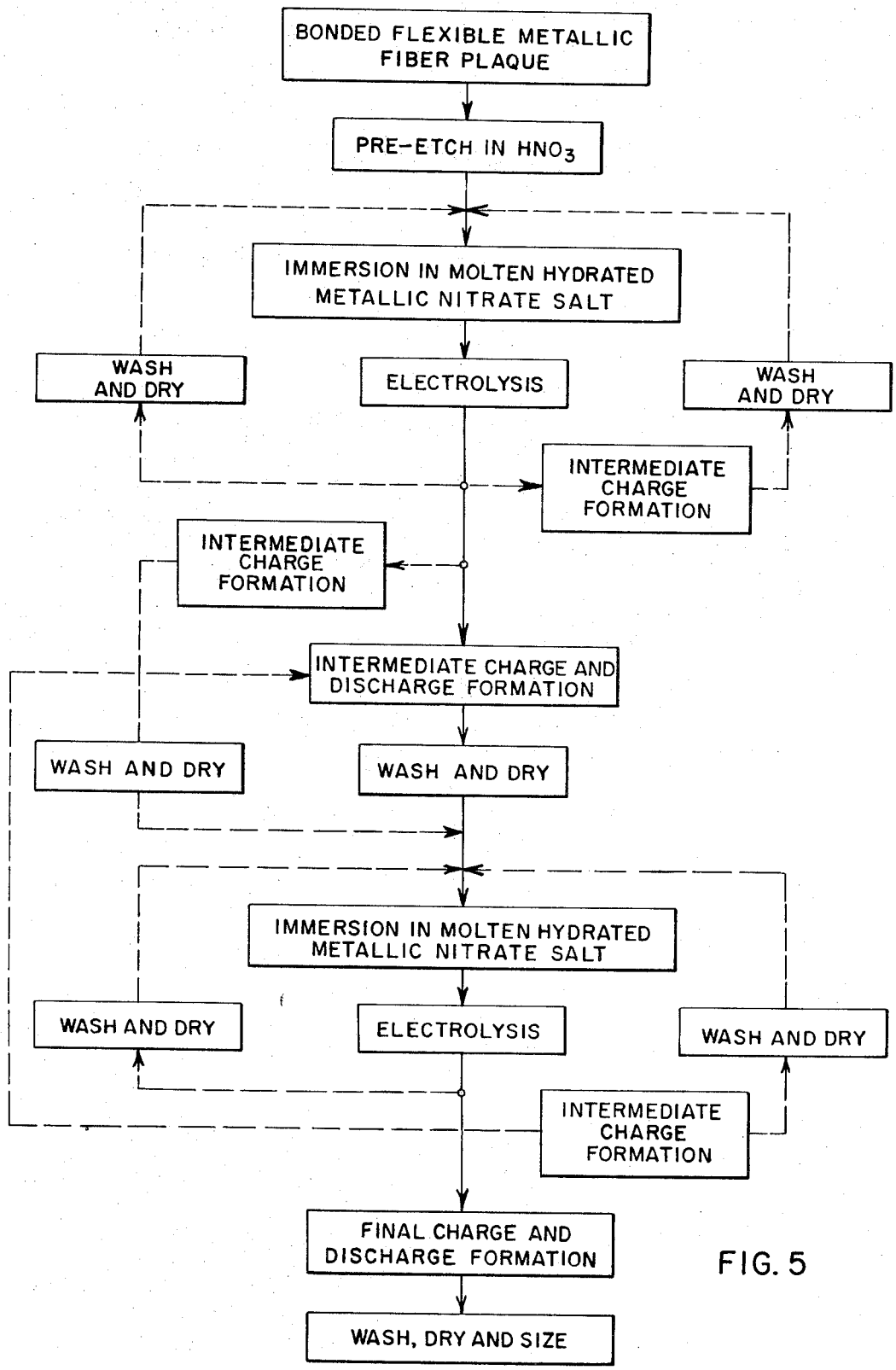
FIG. 5 shows a flow chart of the various means of loading active material encompassed by this invention.

The intermediate formation step follows the loading step. The electrodes are placed in separate nickel trays containing potassium hydroxide. Intermediate formation was done with normal polarity—the positive electrodes are maintained positive and their nickel tray negative; the negative electrodes are maintained negative and their nickel tray positive. Charging was accomplished in separate trays with separate D.C. power supplies. Charging was done with sufficient coulombs input to activate to 10–50% above the theoretical capacity of the active material loaded into the plaque. Charging in all cases was about 10 ma./cm.² for the positive plaques and about 12 ma./cm.² for the negative plaques. A charging step can be used after electrolysis and then the impregnation and electrolysis can be repeated. Also, intermediate charging, discharging and charging formation can be used between a series of impregnation and electrolysis steps or a series of impregnation, electrolysis and charging steps as shown in FIG. 5 of the drawings. In all cases charging was accomplished as described above.

Discharging in all cases was most readily accomplished by reversing the polarity to the D.C. power supply. The positive and negative plates are in their separate containers and separate power supplies are used. In our case discharging was done at a constant current. The current density for discharging was about 10–40 ma./cm.² for the positive plaques and about 30–50 ma./cm.² for the negative plaques.

Figure 4:
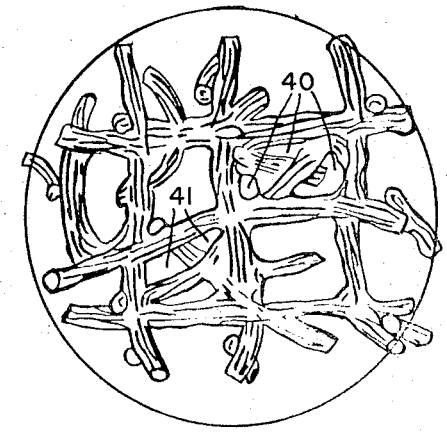
FIG. 4 shows a magnified view of the fibers of the plate structure filled with active material after the conditioning steps.

During the intermediate conditioning, the flexible nickel fiber plaque is expanded. The active material in the charged form (NiOOH and CoOOH in the positive and Cd metal in the negative) compacts against and between and becomes more adherent to the flexible nickel fibers. Consequently, the unfilled capillaries and pores in the electrode are opened up, as shown in FIG. 4 at points 40 and 41, as the spongy mass stresses against the metal fibers spreading them apart and allowing additional higher loading in subsequent impregnation cycles.

During charging the metallic hydroxide active material, $Ni(OH)_2$, is converted to produce the charged form of active material, $NiOOH$, in the positive plaque. In the negative plaque $Cd(OH)_2$, the metallic hydroxide is converted to Cd metal, the charged form of active material. During this conditioning process, the active materials increase in density and, openings are formed into which more active material can be impregnated.

After conditioning of the active material the electrode was removed, washed in deionized water, dried and weighed. This loading, intermediate conditioning cycle can be repeated as often as required to produce the desired predetermined loadings in the electrodes. Usually, 9–13 cycles were required for the positive electrodes and 7–9 cycles for the negative electrodes when the loading intermediate charging formation method is used.

Although the combination intermediate charge formation and intermediate charge and discharge formation process, used to achieve maximum active material loadings, was developed for use in nickel fiber electrodes for nickel cadmium rechargeable cells, it should be understood that it is also applicable to other metal fiber structures such as those made of plated steel or such as nickel plated steel or nickel plated iron.

FIG. 5 shows a flow chart of the possible processes, of our invention wherein possible recycling or repeating of steps is shown by dashed lines. As can be seen, our method covers any series of steps wherein intermediate charging and/or charging and discharging steps are used. There can be recycling of immersion-electrolysis steps prior to intermediate charging and discharging formation, after intermediate charging and discharging formation and there can be repeat intermediate charging and discharging formation steps. There can be intermediate charge formation following electrolysis and there can be repeat immersion, electrolysis, intermediate charge formation prior to and after intermediate charging and discharging formation.

EXAMPLE I

This example used the loading, intermediate charge conditioning method with no discharge until final formation. Sintered nickel fiber structures having fibers .00046 to .00117 inches in diameter and about ⅛ inch in length were used in the experiments. The plaque density was 15 percent of theoretical (85 percent porous) and the electrical resistivity was approximately 315 ohm-cm. The size for the positive plaque was .030 x 1⅝₁₆ x 6½ inches. The volume of the positive plaques was about 4 cm.³. The negative plaque size was .020 x 1⅝₁₆ x 8 inches. One edge of the plaques was coined and nickel lead tabs were attached by welding. All plaques were etched for 15 minutes in 4 gr./liter $HNO_3$ at room temperature. The positive plaques were caged in polypropylene screens and lowered during a period of five minutes (to expel air from the plaque pores) into a molten $$Ni(NO_3)_2 \cdot 6H_2O : Co(NO_3)_2 \cdot 6H_2O$$

(20:1 by weight nickel to cobalt, i.e., 4.16 g./ml. nickel nitrate and .21 g./ml. cobalt nitrate) bath maintained at 85° C. The negative plaques were similarly lowered into a molten $Cd(NO_3)_2 \cdot 4H_2O$ bath. All plaques were then soaked for ten minutes and extracted from the baths. After the excess salt dripped off for two minutes, the plaques were placed into a 25 weight percent KOH solution maintained at 110° C. and given a 15-minute electrolysis. During electrolysis, plaques were always negative, nickel containers positive. A current density of .40 to .50 ma./cm.² was employed. Positive and negative plaques were electrolyzed in separate containers.

Intermediate charge formation in 25 weight percent KOH, in separate but parallel equipment for positive and negative plaques, was accomplished in three 15-minute charge cycles (i.e., 15-min. charging, current off 1-min., 15-min. charging, current off 1-min., 15-min. charging, current off 1-min.). A current density of 10 ma./cm.²/positive plaque and 12 ma./cm.²/negative plaque was employed. The positive electrode was positive and the nickel tray was negative. In the other tray the negative electrode was held negative and the nickel tray was positive.

After intermediate charge formation, the current was shut off and the plaques were removed, washed in a continually changing deionized water bath, dried in forced air ovens at 70° C. and weighed. This cycle (immersion, electrolysis, intermediate charge formation wash and dry) was repeated 13 times for positive plaques and 9 times for the negative plaques. Final formation consisted of about a 16-hour charge, 8-hour discharge, 16-hour charge, 8-hour discharge, 16-hour charge cycle, using the charging and discharging methods heretofore described. The loading history of the plates is shown in the following tables:

TABLE I

| Sample | Positive plaques | | | | |
|---|---|---|---|---|---|
| | 1 | 2 | 3 | 4 | 5 |
| Original wt., gms. | 6.79 | 6.36 | 6.30 | 6.30 | 6.32 |
| Gain Ni (OH)₂, gms.: | | | | | |
| 1st | 1.14 | 1.11 | 1.06 | 1.10 | 1.02 |
| 2d | 1.09 | 1.03 | 1.07 | 0.98 | 1.20 |
| 3d | 1.03 | 1.00 | 0.97 | 0.92 | 1.11 |
| 4th | 1.12 | 1.04 | 1.00 | 1.00 | 1.05 |
| 5th | 1.01 | 0.92 | 1.02 | 0.94 | 1.10 |
| 6th | 0.79 | 0.77 | 0.93 | 0.76 | 0.70 |
| 7th | 0.65 | 0.69 | 0.65 | 0.65 | 0.65 |
| 8th | 0.55 | 0.55 | 0.54 | 0.51 | 0.55 |
| 9th | 0.44 | 0.46 | 0.43 | 0.45 | 0.42 |
| 10th | 0.26 | 0.31 | 0.29 | 0.35 | 0.28 |
| 11th | 0.25 | 0.25 | 0.32 | 0.38 | 0.22 |
| 12th | 0.09 | 0.25 | 0.13 | 0.31 | 0.17 |
| 13th | 0.13 | 0.13 | 0.11 | 0.14 | 0.15 |
| Total gain | 8.55 | 8.51 | 8.32 | 8.49 | 8.62 |

TABLE 2

| Sample | Positive plaques | | | | |
|---|---|---|---|---|---|
| | 1 | 2 | 3 | 4 | 5 |
| Original wt., gms. | 5.82 | 5.86 | 5.88 | 5.82 | 5.84 |
| Gain Ni (OH)₂, gms.: | | | | | |
| 1st | 2.28 | 2.28 | 2.32 | 2.24 | 2.16 |
| 2d | 1.92 | 1.95 | 2.21 | 1.96 | 2.00 |
| 3d | 1.18 | 1.21 | 1.08 | 1.32 | 1.39 |
| 4th | 1.50 | 1.45 | 1.50 | 1.55 | 1.61 |
| 5th | 1.06 | 1.03 | 0.94 | 1.30 | 1.28 |
| 6th | 0.39 | 0.52 | 0.39 | 0.56 | 0.23 |
| 7th ¹ | 0.17 | 0.52 | 0.29 | −0.05 | 0.39 |
| 8th ¹ | 0.91 | 0.31 | 0.56 | 0.93 | 0.86 |
| 9th | 0.25 | 0.26 | 0.23 | 0.35 | 0.33 |
| Total gain | 9.66 | 9.60 | 9.52 | 10.16 | 10.25 |

¹ Plaques were scrapped to remove excess Cd (OH)₂ that adhered to surfaces after 7th and 8th impregnations.

Sub–C size, sealed nickel-cadmium cells were then prepared with loaded positive plaques, loaded negative plaques and nylon cloth separators. The working electrolyte was potassium hydroxide solution (1.30±.02 specific gravity at 25° C.).

Properties obtained on test cells were as follows:

TABLE 3

[Average capacity, ampere-hours (5 cells)]

| | Originally | To 12 cycles | Percent degradation |
|---|---|---|---|
| Drain rate: | | | |
| 0.25 ampere | 1.71 | 1.62 | 5.3 |
| 1.00 ampere | 1.61 | 1.60 | 0.6 |
| 3.50 ampere | 1.50 | 1.44 | 4.0 |
| 10.00 ampere | 1.41 | 1.42 | 0 |

The average internal resistance of the cells was 11.7 milliohms. The average change in capacity (0.25 to 10.0 amperes drain rate range) originally was 17.6% and after 12 cycles was 12.4%.

This data clearly indicates the superiority of these cells in capacity and stability due to their high loading of active material resulting from the series of intermediate charging formation steps. Excellent commercial cells have capacities at .25 ampere of 1.50, at 1.0 ampere of 1.35, at 3.5 amperes of 0.95 and at 10 amperes of .85. As can be seen the percentage superiority of our test cells over what are considered excellent cells in the industry are 14% at .25 ampere, 19% at 1.0 ampere, 58% at 3.5 amperes, and 66% at 10 amperes. Thus, our cells are especially suitable for typical portable appliance rates and other uses such as engine starting and soldering.

Continuous processing should allow even greater loadings per plate (on the other of 10 gms. $Ni(OH)_2$) with consequent increase in capacity per unit cell. Also, the inclusion of intermediate charging and discharging formation steps will maximize the loading of active material in the plaque. Although intermediate charging of the active material alone increases the pickup of active material, even greater pickup of active material can be realized by intermediate charging and discharging the active material in the process.

EXAMPLE II

This example used the loading, intermediate charging and discharging conditioning method, where there was a discharging of plates intermediate in the process.

The same electrode structure was used as in Example I with 85% porosity. The volume of the positive plaques was about 50 cm.$^3$. The plaque were etched as in Example I. They were also impregnated and electrolyzed as in Example I. The conditioning steps consisted of intermediate charging and discharging between impregnation and electrolysis cycles. The process consisted of four repeated, impregnation-electrolysis steps, then the positive plaques were charged for 16 hours, discharged for 8 hours, charged for 16 hours, discharged for 8 hours, and then charged for 8 additional hours. The plaques were then further loaded with active material in three more repeated impregnating-electrolysis steps followed by similar intermediate charging and discharging conditioning steps. Following this, the laques were further loaded in three more repeated impregnating-electrolysis steps followed by final charging and discharging formation. Final formation consisted of charging for 16 hours, discharging for 8 hours, and charging for a final 8 hours. Then the postive plaques were washed, dried and sized. In this example, charging was about 10 ma./cm.$^2$ and discharging was accomplished by reversing polarity to the D.C. power supply. For discharging the current density was about 10 ma./cm.$^2$.

Using intermediate charge and discharge conditioning improved the loading of active material. In Example I, the average loading was about 2.0 grams per cm.$^3$ of positive plaque while in this example the average loading was 2.4 grams per cm.$^3$ of positive plaque. The times used for charging and discharging are in no way limiting and can be as high as 40 hours for charging. Neither is the current time relationship limiting. Also, intermediate charge and discharge formation conditioning should not be limited to a set number of charging and discharging steps, but there must be at least one of each when that method of intermediate conditioning is to be used.

What is claimed is:

1. A method of loading flexible porous battery plaques with active material comprising the steps of:
    (1) depositing a metal salt selected from the group consisting of nickel nitrate and cadmium nitrate within the plaques, followed by
    (2) electrolyzing the plaques by making them electrically negative and reacting the metal salt with hot alkali hydroxide to produce metal $(OH)_2$ active material precipitate within the plaques, followed by
    (3) electrically charging the metal $(OH)_2$ active material precipitate in alkaline hydroxide to convert the metal $(OH)_2$ to its charged state and increase the porosity of the active material within the plaque by
        (a) making the plaques wherein the metal $(OH)_2$ comprises $Ni(OH)_2$ electrically positive to convert the $Ni(OH)_2$ to $NiOOH$ and
        (b) making the plaques wherein the metal $(OH)_2$ is $Cd(OH)_2$ electrically negative to convert the $Cd(OH)_2$ to Cd metal; followed by
    (4) depositing additional metal salt into the plaque after said charging of the active material; followed by
    (5) producing additional active material precipitate by repeating step (2).

2. The method of claim 1 wherein said charging step is followed by the step of electrically discharging the charged active material, the additional metal salt being depositied after the charging and discharging steps.

3. The method of claim 1 wherein the plaques are electrolyzed at a current density between about 0.4 and 0.5 ma./cm.$^2$; and the metal $(OH)_2$ active material is electrically charged at a current density between about 10 and 12 ma./cm.$^2$.

4. The method of claim 1 wherein the nickel salt is molten $Ni(NO_3)_2 \cdot 6H_2O : Co(NO_3)_2 \cdot 6H_2O$ containing a Ni:Co weight ratio of about 20:1 and the cadmium salt is molten $Cd(NO_3)_2 \cdot 4H_2O$.

5. A method of loading flexible, metal fiber battery plaques having a porosity between 75 and 90 percent with active material, comprising the steps of:
    (1) depositing a molten nitrate salt comprising $Ni(NO_3)_2 \cdot 6H_2O$ within the plaque; followed by
    (2) electrolyzing the plaque by making it electrically negative and reacting said nitrate salt with hot alkali hydroxide to produce $Ni(OH)_2$ active material precipitate within the plaque; followed by
    (3) electrically charging the active material precipitate in alkaline hydroxide to increase its porosity within the metal plaque by making the plaque electrically positive to convert the $Ni(OH)_2$ to $NiOOH$; followed by
    (4) depositing additional molten nitrate salt comprising $Ni(NO_3)_2 \cdot 6H_2O$ into the plaque; followed by
    (5) producing additional $Ni(OH)_2$ active material precipitate by repeating step (2).

6. The method of claim 5 wherein said charging step is followed by the step of electrically discharging the charged active material, the additional nitrate salt being deposited after the charging and discharging steps.

References Cited

UNITED STATES PATENTS

| | | | |
|---|---|---|---|
| 2,708,211 | 5/1955 | Koren et al. | 136—28 |
| 2,834,825 | 5/1958 | Wenzelberger | 136—69 |
| 2,969,414 | 1/1961 | Fleischer | 136—29 |
| 3,258,361 | 6/1966 | Kahn | 136—24 |
| 3,266,936 | 8/1966 | Krebs | 136—53 |
| 3,274,028 | 9/1966 | Okinaka et al. | 136—29 |
| 3,284,237 | 11/1966 | Lambert et al. | 136—24 |
| 3,335,033 | 8/1967 | Kober | 136—29 |

WINSTON A. DOUGLAS, Primary Examiner

A. SKAPARS, Assistant Examiner

U.S. Cl. X.R.

136—29, 67, 76; 204—56